US012469041B2

(12) United States Patent
Chinoy et al.

(10) Patent No.: US 12,469,041 B2
(45) Date of Patent: Nov. 11, 2025

(54) MOBILE LOYALTY AND PAYMENT SYSTEM USING TEMPORARY SHORT CODES

(71) Applicant: Tillster, Inc., San Diego, CA (US)

(72) Inventors: Bilal A. Chinoy, San Diego, CA (US); Anthony Kua, San Diego, CA (US)

(73) Assignee: Tillster, Inc., San Diego, CA (US)

(*) Notice: Subject to any disclaimer, the term of this patent is extended or adjusted under 35 U.S.C. 154(b) by 0 days.

(21) Appl. No.: 14/269,020

(22) Filed: May 2, 2014

(65) Prior Publication Data

US 2015/0317663 A1  Nov. 5, 2015

(51) Int. Cl.
*G06Q 30/0207* (2023.01)
*G06Q 20/20* (2012.01)
(Continued)

(52) U.S. Cl.
CPC ....... *G06Q 30/0207* (2013.01); *G06Q 20/202* (2013.01); *G06Q 20/322* (2013.01);
(Continued)

(58) Field of Classification Search
CPC .............. G06Q 30/0207; G06Q 20/20; G06Q 30/0225; G06Q 30/0238; G06Q 30/0226
See application file for complete search history.

(56) References Cited

U.S. PATENT DOCUMENTS 5,758,129 A    5/1998  Gray
6,687,679 B1 * 2/2004  Van Luchene ..... G06Q 30/0601
                                                    705/16

(Continued)

FOREIGN PATENT DOCUMENTS

WO   WO-2007082252 A1 *  7/2007 ............. F28D 7/026
WO   WO-2016183508 A1 * 11/2016 ............. G06Q 20/32
WO   WO-2017028522 A1 *  2/2017 ............... H04L 9/32

OTHER PUBLICATIONS

Ken DiPrima. "Sales Incentives: Just What The Doctor Ordered?" (Oct. 30, 2014). Retrieved online Nov. 9, 2023. http://www.gps-business.net/sales-incentives-just-what-the-doctor-ordered/ (Year: 2014).*

(Continued)

*Primary Examiner* — James A Reagan
(74) *Attorney, Agent, or Firm* — Knobbe, Martens, Olson & Bear, LLP

(57) ABSTRACT

A loyalty server enables customers to use a merchant's mobile loyalty and payment program by pairing a customer's loyalty account through use of temporary codes. A customer may login to the customer's loyalty and payment account using a loyalty application installed on a mobile device. The customer can request a temporary code from the loyalty server, and provide it to a POS system associated with a merchant. The POS system can send a request to the loyalty server to retrieve customer information corresponding to the temporary code. The POS system can receive the customer's information, and the customer then earns rewards for transactions conducted with the merchant. In some embodiments, the POS system conducts a transaction using rewards or coupons. In some embodiments, the loyalty server obtains and utilizes the geolocation of the mobile device and the merchant as a portion of the means for pairing.

30 Claims, 8 Drawing Sheets

(51) Int. Cl.
  *G06Q 20/32* (2012.01)
  *G06Q 20/38* (2012.01)
  *G06Q 30/0226* (2023.01)
  *G06Q 30/0238* (2023.01)

(52) U.S. Cl.
  CPC ......... *G06Q 20/385* (2013.01); *G06Q 20/387* (2013.01); *G06Q 30/0225* (2013.01); *G06Q 30/0226* (2013.01); *G06Q 30/0238* (2013.01)

(56) References Cited

U.S. PATENT DOCUMENTS

| | | | |
|---|---|---|---|
| 7,740,171 | B2 | 6/2010 | Kingsborough et al. |
| 8,514,968 | B2* | 8/2013 | Jovicic .................. H04W 64/00 375/267 |
| 8,577,336 | B2* | 11/2013 | Mechaley, Jr. ...... G06Q 20/401 455/411 |
| 8,626,593 | B2* | 1/2014 | Goldfinger ............. G06Q 20/20 705/21 |
| 8,630,907 | B2* | 1/2014 | Mardikar ........... G06Q 20/4015 370/352 |
| 8,646,063 | B2* | 2/2014 | Dowlatkhah ........... G06F 21/31 726/10 |
| 8,914,645 | B2* | 12/2014 | Duncan ............... H04L 63/0861 713/186 |
| 9,143,506 | B2* | 9/2015 | Duncan .................. G06F 21/32 |
| 9,305,295 | B2* | 4/2016 | Laracey ................ G06Q 20/20 |
| 9,521,521 | B2* | 12/2016 | Hillary .................. H04W 4/021 |
| 2007/0177768 | A1* | 8/2007 | Tsantes .................. G06Q 10/00 382/115 |
| 2008/0275821 | A1* | 11/2008 | Bishop ................ G06Q 20/382 705/64 |
| 2009/0323648 | A1* | 12/2009 | Park ...................... H04W 8/005 370/338 |
| 2010/0218241 | A1* | 8/2010 | Faryna .................. H04L 9/3226 726/5 |
| 2010/0280909 | A1* | 11/2010 | Zhang .................. G06Q 20/202 705/17 |
| 2011/0078031 | A1* | 3/2011 | Mardikar ........... G06K 19/0723 705/17 |
| 2011/0307318 | A1* | 12/2011 | LaPorte ............... G06Q 20/387 705/14.27 |
| 2012/0057646 | A1* | 3/2012 | Jovicic .................. H04W 4/021 375/295 |
| 2012/0116901 | A1* | 5/2012 | Bishop .................. G06Q 20/40 705/16 |
| 2012/0129492 | A1 | 5/2012 | Mechaley, Jr. |
| 2012/0203572 | A1 | 8/2012 | Christensen |
| 2012/0267432 | A1 | 10/2012 | Kuttuva |
| 2012/0296679 | A1 | 11/2012 | Im |
| 2013/0013433 | A1 | 1/2013 | Rose et al. |
| 2013/0036001 | A1 | 2/2013 | Wegner et al. |
| 2013/0046608 | A1 | 2/2013 | Coppinger |
| 2013/0138497 | A1 | 5/2013 | Yan et al. |
| 2013/0173484 | A1* | 7/2013 | Wesby .................. G06K 7/1417 705/318 |
| 2013/0197987 | A1 | 8/2013 | Doka et al. |
| 2013/0218777 | A1* | 8/2013 | Kingston ............... G06Q 30/06 705/44 |
| 2013/0232017 | A1* | 9/2013 | Nathanel .............. G06Q 20/385 705/16 |
| 2014/0089073 | A1* | 3/2014 | Jacobs ................. G06Q 20/326 705/16 |
| 2014/0100932 | A1 | 4/2014 | Goldfinger et al. |
| 2014/0143146 | A1* | 5/2014 | Passanha ............. G06Q 20/385 705/44 |
| 2014/0230032 | A1* | 8/2014 | Duncan ............... H04L 63/0861 726/7 |
| 2014/0230033 | A1* | 8/2014 | Duncan .................. G06F 21/32 726/7 |
| 2014/0244373 | A1* | 8/2014 | Laiderman ......... G06Q 30/0225 705/14.31 |
| 2015/0087303 | A1* | 3/2015 | Hillary .................. H04W 12/64 455/435.1 |
| 2015/0089239 | A1* | 3/2015 | Yang ........................ G06F 21/00 713/184 |
| 2015/0120428 | A1* | 4/2015 | Hardison ............. G06Q 20/202 705/14.27 |

OTHER PUBLICATIONS

International Preliminary Report on Patentability dated Apr. 8, 2016 for International Patent App. No. PCT/US15/27903 filed Apr. 28, 2015.
International Search Report and Written Opinion dated Aug. 4, 2015 in PCT/US15/27903.
Choi, Candice, "Wendy's rolls out mobile payment in US restaurants" Yahoo! Finance, http://finance.yahoo.com/news/wendys-rolls-mobile-payment-us-161140646.html, Mar. 21, 2014.
Johnson, Lauren, "Wendy's trials mobile payments with commerce-enabled app" Mobile Commerce Daily, http://www.mobilecommercedaily.com/wendy%E2%80%99s-enters-mobile-payment-space-with-upgraded-app, May 6, 2013.
B.good 'Family App', Capture Code, ver. 1.3.15, updated Jan. 11, 2015, Android Apps on GooglePlay, https://play.google.com/store/apps/details?id=com.wierzbinski.bgood&hl=en, 2 pgs., printed as of Feb. 2, 2015.
'IVend POS' Loyaly App, iVend, ver. 2.0.1, updated Aug. 7, 2014, Android Apps on Google Play, https://play.google.com/store/apps/details?id=com.citixsys.ivendpos, 4 pgs., printed as of Feb. 2, 2015.
'FREEquents' App, FREEquents, ver. 1.3.0, updated Aug. 13, 2012, Android Apps on Google Play, https://play.google.com/store/apps/details?id=mobile.freequents.com, 2 pgs., printed as of Feb. 2, 2015.
'MyPlumReward' App, Plumreward.com, ver 1.3.5, updated Mar. 26, 2013, App Store on iTunes, https://itunes.apple.com/us/app/myplumreward/id431450469?mt=8, 2 pgs., printed as of Feb. 2, 2015.
'Passbook' iOS App, Apple, released Sep. 19, 2012, http://support.apple.com/en-us/HT204003, 5 pgs., printed as of Feb. 2, 2015.
Google Wallet App, Google, updated Dec. 11, 2014, Android Apps on Google Play, https://play.google.com/store/apps/details?id=com.google.android.apps.w, 4 pgs., printed as of Feb. 2, 2015.
'GetOne' App, GetOne Rewards, ver 2.6.4, updated Mar. 18, 2014, Android Apps on Google Play, https://play.google.com/store/apps/developer?id=GetOne+Rewards, 3 pgs., printed as of Feb. 2, 2015.
'RewardLoop' App, ver. beta, http://corp.rewardloop.com/features, 13 pgs., printed as of Feb. 2, 2015.
'SpotOn Mobile' App, SpotOn, Inc., ver. 3.1.1, updated Jun. 12, 2014, Android Apps on Google Play, https://play.google.com/store/apps/details?id=com.spoton.mobile.android&hl=en, 4 pgs., printed as of Feb. 2, 2015.
'Starbucks' App, Starbucks Coffee Company, ver. 2.8, updated Jan. 8, 2015, Android Apps on Google Play, https://play.google.com/store/apps/details?id=com.starbucks.mobilecard&hl=en, 4 pgs., printed as of Feb. 2, 2015.
'Dunkin'Donuts' App, Dunkin' Brands, Inc., ver. 3.3.1, updated Dec. 8, 2014, Android Apps on Google Play, https://play.google.com/store/apps/details?id=com.skcc.corfire.dd&hl=en, 3 pgs., printed as of Feb. 2, 2015.
'MOGL' App, MOGL Loyalty Services, Inc., ver. 4.2.4, updated Dec. 23, 2014, Android Apps on Google Play, https://play.google.com/store/apps/details?id=com.mogl&hl=en, 4 pgs., printed as of Feb. 2, 2015.
'Square Order' App, Square, Inc., ver. 2.3.2, updated Jan. 8, 2015, Android Apps on Google Play, https://play.google.com/store/apps/details?id=com.square.pickup&hl=en, 4 pgs., printed as of Feb. 2, 2015.
European Search Report from related application No. 15786008.1, dated Jan. 3, 2018.
Office Action received in corresponding application No. MX/a/2016/014108 dated Feb. 11, 2019.
Office Action received in Canadian application No. 2,947,131 mailed Jul. 12, 2021.

(56) References Cited

OTHER PUBLICATIONS

Summons to attend oral proceedings received in Application No. EP 15 786 008.1, mailed Mar. 16, 2021.
Australian Office Action received in Application No. 2015253381 dated Oct. 4, 2019.
Australian Office Action received in Application No. 2015253381 dated Sep. 2, 2020.
Office Action received in EP 15 786 008.1 dated Feb. 26, 2020.
Indian Office Action received in Application No. 201617041026 dated Oct. 23, 2020.
Mexican Office Action received in Application No. MX/a/2016/014108 dated Jul. 12, 2019.
Mexican Office Action received in Application No. MX/a/2016/014108 dated Feb. 26, 2020.
Mexican Denial Resolution received in Application No. MX/a/2016/014108 dated Oct. 27, 2020.
Extended European Search Report received in EP 21205372.2, mailed Nov. 26, 2021.
Office Action received in CA 2,947,131, mailed May 9, 2022.
Indian Office Action dated Mar. 28, 2022 for Application No. 202118018903.

* cited by examiner

MOBILE LOYALTY AND PAYMENT SYSTEM USING TEMPORARY SHORT CODES

BACKGROUND

1. Field of the Invention

This disclosure relates generally to the field of mobile loyalty and payment systems, and specifically to mobile loyalty and payment systems using temporary short codes. This disclosure also relates to the use of a virtual wallet in a mobile loyalty and payment program, and further relates to the use of geolocation information in conjunction with temporary short codes.

2. Description of the Related Technology

In an ever-changing marketplace, more and more merchants are updating their loyalty programs as well as their payment options to take advantage of new technology. These changes are made with the hopes of attracting and retaining customers. One way to attract and retain customers is by rewarding them for their loyalty to a specific merchant Another way to attract and retain customers is by making the overall interaction with the merchant convenient, secure, or entertaining.

In today's marketplace, more and more customers use applications installed on their mobile devices. More and more merchants are tapping into this trend by creating mobile applications that allow customers to interact with the merchant on some level. This interaction may occur before, during, or after a transaction with the merchant. While there are mobile applications that give customers access to more payment options and mobile applications that give customers access to loyalty programs, there are several disadvantages of these applications. For example, most applications only give customers access to extra payment options or access to a loyalty program, not both.

One of the other disadvantages of these applications is that some of them require merchants to purchase additional hardware. However, due to the rapid change of technology used in the marketplace, hardware can easily become outdated or obsolete, and merchants that invest in this hardware may waste money by investing in the wrong technology. Further, extra hardware may create additional problems that make the hardware inconvenient to use and maintain. For example, some companies invest in scanners with the capability of scanning quick response (QR) codes to allow customers to pay for the products that a merchant offers. These QR codes are generally just gift card numbers reformatted as QR codes, and this method is mostly an alternative to swiping a gift card at the merchant. As with most barcode scanners, the scanners purchased by the merchants do not always operate properly, and the merchant often ends up typing the associated gift card number into their point of sale (POS) system manually. As such, this method is often inconvenient for the customer as well as the merchant.

Other payment programs or loyalty programs require a customer to give the merchant their personal telephone number before conducting a transaction. When a customer is giving their personal telephone number to a merchant, other people present at the merchant can obtain the customer's phone number. This may further lead to security or privacy issues for the customer, which is not desirable in any system.

In other payment programs or loyalty programs, customers are required to carry a card containing their account number on them. The merchants generally swipe a magnetic strip contained on the card, or scan a barcode printed on the card to obtain the customer's account number. However, if the customer forgets or loses their card, they are often unable to use the payment program or loyalty program. Additionally, the magnetic strip or barcode on the card may wear down over time, or the hardware used to obtain the customer's account number may not always function properly. Therefore, the problems with these methods do not make the transaction convenient for the customer or the merchant.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In accordance with one aspect of the disclosure, a mobile loyalty and payment system is disclosed that enables a loyalty server to receive data from customer using a mobile device, generate a unique temporary short code for the customer, store the temporary short code in a database, and transmit the temporary short code back to the mobile device. The loyalty server may also be enabled to receive a code query from a point of sale system, compare the code contained in the code query against codes stored in the database, and upon finding a matching code, transmit information about the customer matched to the code query back to the point of sale system. The loyalty server may also maintain the database, and the database may include identifying information regarding customers registered to use the mobile loyalty and payment system, temporary codes and their associations to the customers, information about the customers' transaction history, and information about the customers' rewards or coupons.

In accordance with another aspect of the disclosure, the loyalty server may be enabled to receive transaction information from a point of sale system, to reward customers with rewards or coupons based on the transactions they conduct through the server, and to transmit a customer's available rewards or coupons to the point of sale system. The loyalty server can also be enabled to send confirmation to a customer through their mobile device based on the transactions conducted in the mobile loyalty and payment system, and may also allow a customer to access reward or coupon information through a loyalty application installed on the customer's phone.

In various embodiments, the temporary short code may be removed from the loyalty server after some defined period of time, may be removed from the loyalty server after the customer completes a transaction using the code. In some embodiments, the length of the temporary short code may be less than the length of the customer's telephone number. In other embodiments, the loyalty server may be configured to obtain or receive the geolocation of the customer's mobile device and the POS system. In accordance with these embodiments, the loyalty server may be enabled to create a temporary short code that is based in part on the geolocation information received. In various embodiments, the loyalty server may only send the customer a portion of the temporary code that is less than the length of the customer's telephone number.

A shorter number sent to the customer may be more convenient for a customer to use, and a code that is removed from the loyalty server after it is used may not cause security issues for customer's using the mobile loyalty and payment program. In various embodiments, the loyalty server may also be enabled to facilitate mobile payment by the customer to the merchant. This mobile payment may include the use of an aggregated total of gift cards loaded on to a customer's mobile device.

The mobile loyalty and payment system disclosed may also provide for a mobile application that contains a loyalty program as well as provide for alternate means of payment within one application. The system disclosed may not require a merchant to purchase additional hardware, and can create an experience that is convenient, secure, and even entertaining for customers to use.

In addition or as an alternative to using a temporary short code, a customer may use their phone number or a stored value card to access the mobile loyalty and payment system. The customer may give this information to the merchant in connection with a transaction, and the POS system may obtain the customer's information from the loyalty server this way. The operation may otherwise be the same as described above.

As used in this disclosure, the words temporary code, temporary short code, and short code may be used interchangeably. However, the use of the terms "short" or "temporary" with respect to the code does not necessarily mean that all embodiments of the code used in the mobile loyalty and payment system must be short or temporary. Additionally, as used in this specification, the words reward and coupon may carry different meanings in some embodiments, and may carry the same or similar meaning in other embodiments. Generally, the word reward or rewards may refer to something a customer has earned by their own participation in the mobile loyalty and payment system. Reward or rewards may refer to a specific reward that a customer may redeem for a merchant's goods or services, and it may also refer to the points a customer earns within the mobile loyalty and payment system. Generally, the word coupon or coupons refers to a promotional offer created by the merchant, which may be added to a customer's account automatically or manually, and may be independent of the customer's actions in the mobile loyalty and payment program.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION OF CERTAIN ILLUSTRATIVE EMBODIMENTS

Figure 1:
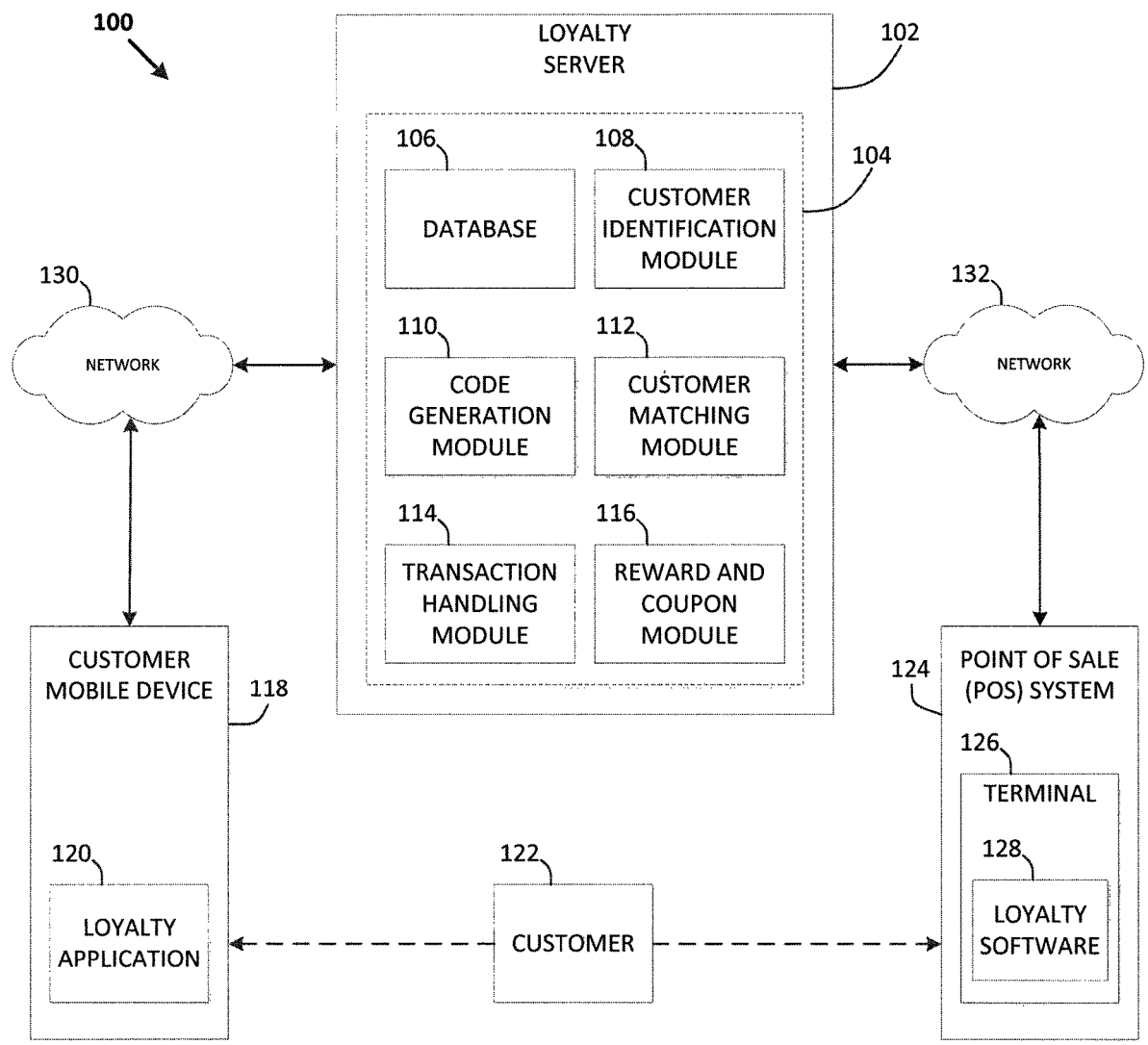
FIG. 1 shows a simplified block diagram of one embodiment of various components that may be used in a mobile loyalty and payment system.

FIG. 1 shows a simplified block diagram of one embodiment of various components that may be used in a mobile loyalty and payment system 100. The main components of the mobile loyalty and payment system 100 may be a loyalty server 102, a customer mobile device 118, and a point of sale (POS) system 124. The POS system 124 may contain a terminal 126, and the terminal 126 may utilize loyalty software 128. The customer mobile device 118 may utilize a loyalty application 120. In one exemplary embodiment, the customer 122 can use a loyalty application 120 running on a customer mobile device 118 to receive a temporary code from the loyalty server 102, and the customer 122 may give that temporary code to a user (not shown) operating the loyalty software 128 on a POS terminal 126 within a POS system 124. In one exemplary embodiment, the customer mobile device 118 may be a customer's mobile phone or laptop, and the loyalty application 120 may be configured to run on an iPhone® device, an Android® device, or another device using html5. In another exemplary embodiment, the loyalty software 128 may be POS integrated software. This temporary code may be used by the POS system 124 to retrieve information about the customer 122 from the loyalty server 102.

The customer mobile device 118 or the loyalty application 120 may connect to the loyalty server 102 through a network 130, and the POS system 124, the POS terminal 126, or the loyalty software 128 may also connect to the loyalty server 102 through a network 132. The networks 130 and 132 may be the same network, or they may be separate networks. In one exemplary embodiment, the networks 130 and 132 may be the Internet. In other exemplary embodiments, the networks 130 and 132 may be some other wired or wireless gateways that connect one device to another, such as a local area network (LAN) or a wide area network (WAN). In one exemplary embodiment, the loyalty server 102 may be remote from the point of sale system 124. However, a skilled artisan will appreciate that the loyalty server 102 may be located within the point of sale system 124, the POS terminal, or the loyalty software 128.

The loyalty server 102 can contain a processor 104 configured to manage a database 106 through the use of various modules. These modules may include a customer identification module 108, a code generation module 110, a customer matching module 112, a transaction handling module 114, or a reward and coupon module 116. In one exemplary embodiment, the processor 104 utilizes all of these modules (108, 110, 112, 114, and 116) to connect the customer mobile device 118 to the point of sale system 124 through the loyalty server 102. Various processes of creating and utilizing this connection as well as apparatuses capable of creating and utilizing this connection are explained below.

Figure 2:
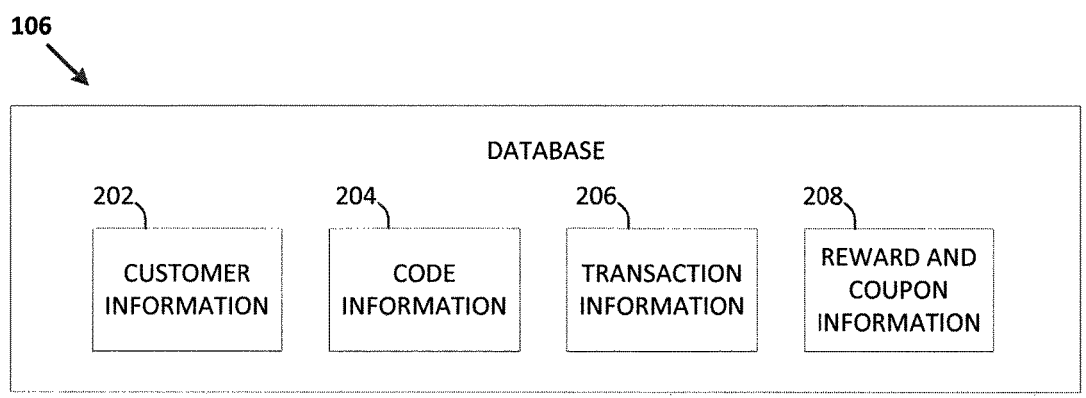
FIG. 2 shows a simplified block diagram depicting illustrative contents of a database used in accordance with the mobile loyalty and payment system as shown in FIG. 1.

FIG. 2 shows a simplified block diagram depicting illustrative contents of a database 106 used in accordance with the mobile loyalty and payment system 100 as shown in FIG. 1. The database 106 may contain customer information 202, code information 204, transaction information 206, or reward and coupon information 208. In one exemplary embodiment, the database 106 contains all of this information (202, 204, 206, and 208). This information may be used in the process of creating and utilizing the mobile loyalty and payment system 100 of FIG. 1. The particular uses of this information contemplated by this application are described in greater detail below.

Figure 3:
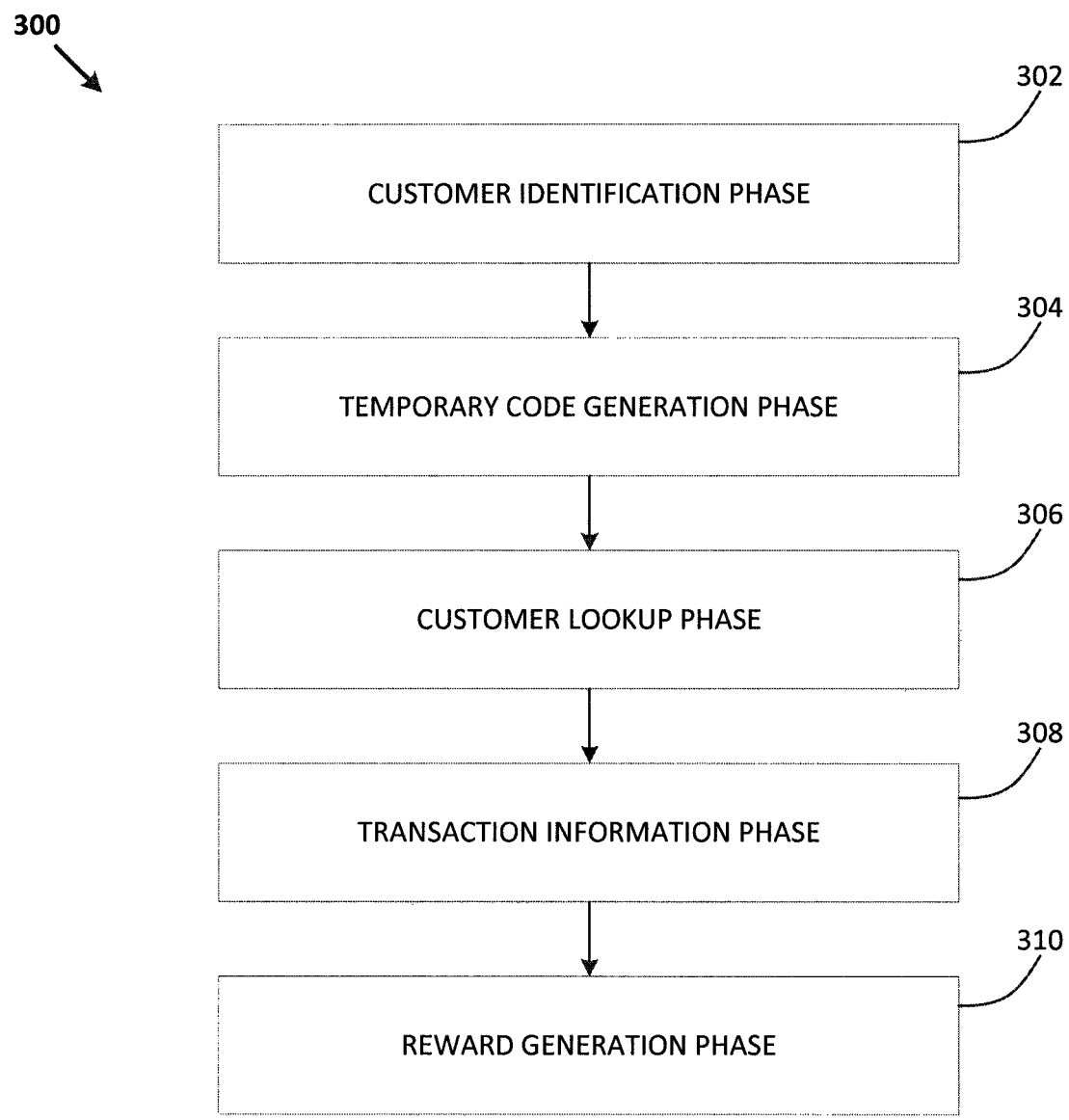
FIG. 3 is a flowchart illustrating various potential phases of operation by which an apparatus managing a mobile loyalty and payment may be implemented.

FIG. 3 is a flowchart illustrating various potential phases of operation by which an apparatus managing a mobile loyalty and payment may be implemented. This apparatus may be the loyalty server 102 of FIG. 1. The process 300 may start at the customer identification phase 302, move to the temporary code generation phase 304, move next to the customer lookup phase 306, then move to the transaction information phase 308, and finally finish at the reward generation phase 310. In one exemplary embodiment, a process 300 of managing the mobile loyalty and payment system 100 contains all of these phases (302, 304, 306, 308, and 310). However, a skilled artisan will appreciate that the order of these phases may be changed, that the process 300 may still function without some of the described phases, and that the process 300 may still function with the addition of other phases.

Figure 4:
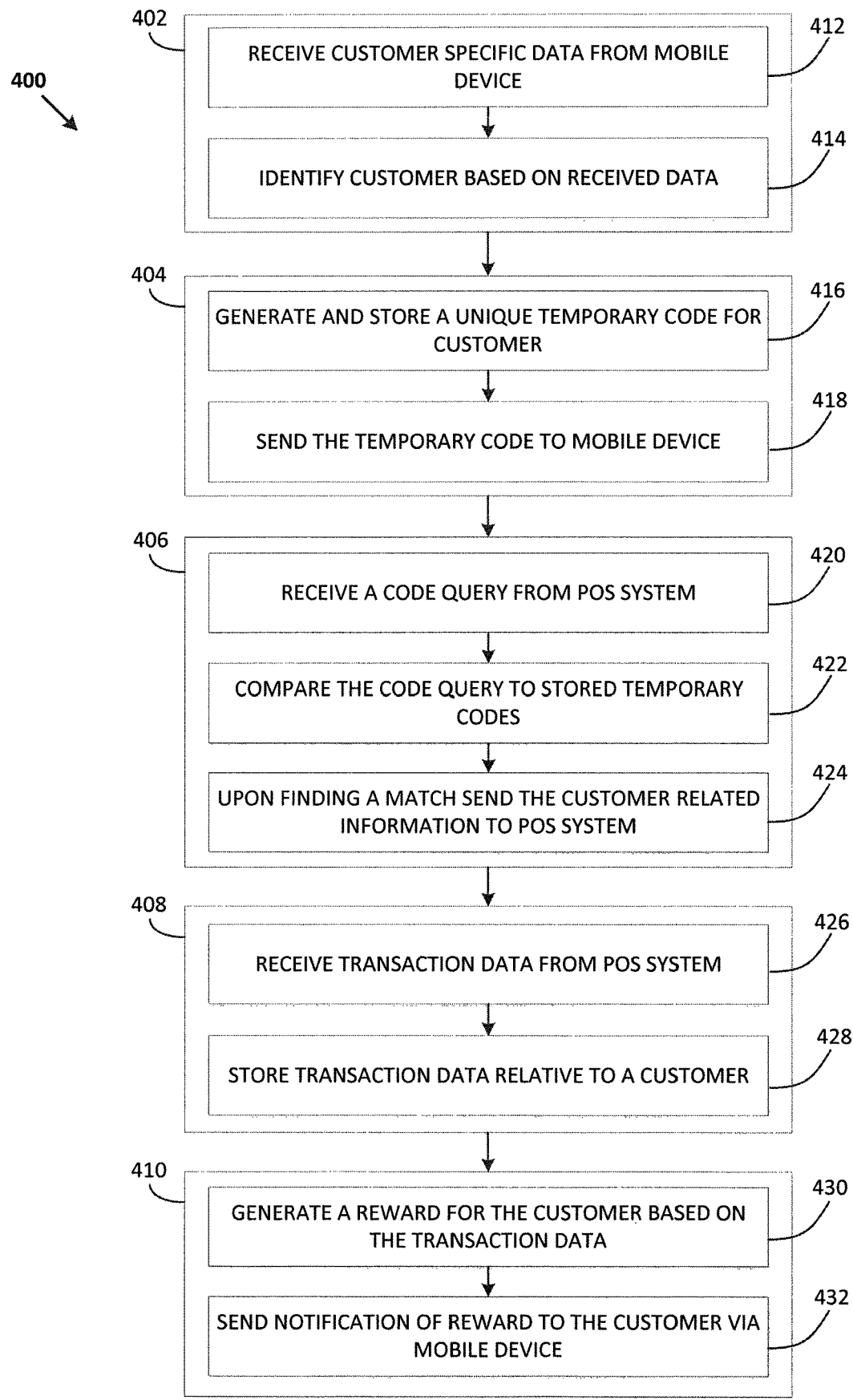
FIG. 4 is a flowchart further illustrating steps that may be taken in each phase shown in FIG. 3.

FIG. 4 is a flowchart further illustrating steps that may be taken in each phase shown in FIG. 3. Process 400 may start at the customer identification phase 402, move to the temporary code generation phase 404, move next to the customer lookup phase 406, then move to the transaction information phase 408, and finally finish at the reward generation phase 410. Specifically, the customer identification phase 402 may contain a step 412 to receive customer specific data from a mobile device, and a step 414 to identify customer based on the received data. These steps may be implemented by using the customer identification module 108 and the customer information 202 stored on the database 106. The data received from the customer mobile device 118 may include a unique identifier that identifies the customer 122 or the customer mobile device 118. In one embodiment, the data received from the customer mobile device 118 may also include one or more rewards or coupons that the customer 122 wishes to redeem.

This unique identifier may be the customer's name, the customer's email address, the customer's screen name, a customer ID created for use in the mobile loyalty and payment system 100, or some other unique numerical or alphanumerical string. Additionally, a skilled artisan will appreciate that some other method of uniquely identifying a customer 122 using the mobile loyalty and payment system 100 may be used. In one embodiment, identifying the customer 122 based on the data received comprises comparing at least some portion of the data received with some other portion of the customer information 202 stored on the database 106. Upon identifying the customer 122, the process 400 may move to the temporary code generation phase 404. If the customer 122 cannot be identified the process 400 may provide some method of handling this issue, which may include sending an error message to the mobile device or continuing the process 400 anyway.

The temporary code generation phase 404 may contain a step 416 to generate and store a unique temporary code for customer and may contain a step 418 to send the temporary code to the mobile device. The generation of a unique temporary code in step 416 may be through the use of the code generation module 110 and the code information 204 stored on the database 106. In one embodiment, the unique temporary code can be a unique four-digit short code assigned to the customer 122 or the customer mobile device 118 for fifteen minutes. In other embodiments, the temporary code may be more or less than four digits, and the code may last for more or less than fifteen minutes. The loyalty server 102 may generate this temporary code by various methods, as long as the code is unique. Since a company (not shown) utilizing the mobile loyalty and payment system 100 may have multiple locations, a code that is short in length might not be sufficient to handle the company's needs. For example, if the mobile loyalty and payment system 100 utilized four-digit temporary codes, then this would only allow for ten thousand unique temporary codes at one time, assuming the temporary code is only composed of numbers. In other embodiments, the temporary code may be comprised of just letters, or a combination of numbers and letters.

However, it is conceivable that a company might have too many customers 122 attempting to use the mobile loyalty and payment system 100 at a time that there are not enough unique temporary codes. This can depend on the length of the temporary code as well as the amount of time the code is available for use in the mobile loyalty and payment system 100. Additionally, it is conceivable that even if there are enough temporary codes, a company still may not wish to have so few available temporary codes at one time (e.g., for security reasons). Therefore, the addition of unique information to the temporary code may be desirable. In one embodiment, this unique information may be geolocation information associated with either the customer mobile device 118 or the point of sale system 124. Potential generation and use of geolocation information is described later in process 600 and process 700. In other embodiments, the additional unique information may be other information that may be stored on, or obtained from, a customer mobile device 118 or a point of sale system 124 or both.

Whatever method is used to generate the temporary code, it is desirable for the mobile loyalty and payment system 100 to keep track of what customer 122 is associated with the temporary code. In one embodiment, the code generation module 110 may store this information on the database 106. Specifically, this information may be stored in the code information 204, and may relate to the customer information 202, or vice versa. A skilled artisan would appreciate that various methods of storing information in a database for later access may be utilized. The temporary code may then be sent to the customer mobile device 118 in various ways. In one embodiment, the temporary code is sent to the customer mobile device 118 through the use of the loyalty application 120. In another embodiment, the temporary code is sent to the customer mobile device 118 through a short message service (SMS).

Process 400 may then move to the customer lookup phase 406 which may include a step 420 to receive a code query from a POS system, a step 422 to compare the code query to stored temporary codes, and a step 424 upon finding a match to send the information relating to the customer to the POS system. The code query of step 420 may be received by the loyalty server 102 in various ways. In one embodiment, a user (not shown) may be using a terminal 126 which is part of a point of sale system 124 and which is running loyalty software 128. The customer 122 may notify the user using the terminal 126 of the temporary code that the customer 122 received in step 404 for use in the mobile loyalty and payment system 100. The customer 122 may notify the user by simply reciting the temporary code out loud, by showing the user the temporary code that may be displayed on customer mobile device 118, by manually entering the code into a keypad (not shown) which is connected to the terminal 126 or the POS system 124, or by some other method of delivery. Once the user receives the temporary code, the user may then input the code into the terminal 126. The POS system 124 may then send a code query to the loyalty server 102 through the network as described above.

Once the loyalty server 102 receives this code query, in step 422 the customer matching module 112 may be used to compare the code it receives with stored temporary codes. In one embodiment, the customer matching module 112 can compare the code received from the code query to the temporary codes stored in the code information 204 portion of the database 106. Each stored temporary code may relate to a customer 122 whose information is stored in the customer information 202 portion of the database 106. Upon finding a match, in step 424 the customer matching module 112 may send information about the identified customer 122 to the POS system 124. This information may include the customer's name, phone number, home address, a photo, loyalty account number, or available rewards and coupons for use in the mobile loyalty and payment system 100. A customer's available rewards and coupons may be stored in the reward and coupon information 208 stored on the database 106, and may relate to the customer information 202 portion of the database 106, or vice versa. The information about the identified customer 122 may also include information corresponding to the customer's interactions with or modifications to a loyalty account associated with the customer. For example, a selection of coupons or rewards to be redeemed, a designation of payment methods or amount, an identification of a category of purchases or other transactions to be made at a corresponding POS terminal, or any combination thereof. If the customer matching module 112 is unable to identify a match, it may send an appropriate error message to the POS system 124.

Once this information is sent to the POS system 124, process 400 may move to the transaction information phase 408. The transaction information phase 408 may include a step 426 to receive transaction data from a POS system, and a step 428 to store transaction data relative to a customer. In one exemplary embodiment, a user (not shown) of the terminal 126, the POS system 124, or some other device running the loyalty software 128, can conduct a transaction with the customer 122 using the information received from step 424. In conducting the transaction, the POS terminal 126 may display at least some of the customer's information to the user. In one exemplary embodiment, the POS terminal 126 may display the customer's name, phone number, email address, and available rewards and coupons. In another exemplary embodiment, the user may be a barista at a coffee shop, and the customer 122 may order a coffee through the mobile loyalty and payment system 100 using a temporary code. In this embodiment, the ordering of the coffee may involve the use of one of the customer's available rewards or coupons. When the transaction is complete, the POS system 124 may send information about the transaction to the loyalty sever 102 through the network 132. In step 426, the transaction handling module 114 may receive the transaction information from the POS system 124, and in step 428 the transaction handling module 114 may handle and store at least some portion of the transaction using the transaction information 206 portion of the database 106.

In one exemplary embodiment, the transaction handling module 114 can store the price of the transaction, the items ordered in the transaction, the location or name of the store where the transaction took place, the time the transaction took place, or other information that may be relevant to a customer 122 or a company (not shown) using the mobile loyalty and payment system 100. In one exemplary embodiment, each transaction stored in the transaction information 206 portion of the database 106 can relate to a customer 122 stored in the customer information 202 portion of the database 106. The information stored may be used to determine trends among customers 122 or companies, which may help a company improve the way the mobile loyalty and payment system 100 is implemented. In one exemplary embodiment, a company may be able to provide targeted marketing to a customer 122 on the customer's mobile device 118 based on their transaction history stored in the transaction information 206 portion of the database 106. A company may also provide targeted marketing to a customer 122 based on the customer information 202 stored in the database, alone or in combination with the transaction information 206.

The transaction handling module 114 may also be configured to handle transactions where the customer 122 uses one of their available rewards or coupons. In one exemplary embodiment, the transaction handling module 114 may remove the reward or coupon from the reward and coupon information 208 portion of the database 106. In another exemplary embodiment, the transaction handling module 114 may mark the reward or coupon stored in the reward and coupon information 208 as used to prevent the reward or coupon from being used again. This may be desirable if a customer 122 or a company (not shown) using the mobile loyalty and payment system 100 wishes to later utilize information about the rewards and coupons used. The transaction handling module 114 may also be configured to remove the temporary code from the code information 204 portion of the database 106 after the code is used in a transaction. This will free up the code for another customer 122 to use at a later time.

Once the information is stored, process 400 may move to the reward generation phase 410, which may contain a step 430 to generate a reward for the customer based on the transaction data and a step 432 to send notification of reward to the customer via a mobile device. In one exemplary embodiment, these steps may be handled by the reward and coupon module 116 using the reward and coupon information 208 stored on the database 106. In step 430, the reward and coupon module 116 may be configured to reward the customer 122 based on the price of the transaction, based on the items ordered in the transaction, or based on some other information.

In one exemplary embodiment, the reward and coupon module 116 can reward the customer 122 one point for every dollar spent using the mobile loyalty and payment system 100, and the reward and coupon module 116 can reward the customer 122 with a free drink reward for every forty points earned. In another embodiment, the reward and coupon module 116 may keep track of how many points a customer 122 has earned, and the customer 122 may select which reward they wish to redeem their available points for. The reward and coupon module 116 may round the price of the transaction up or down to the nearest dollar in order to only reward a whole number of points to the customer 122.

Additionally, the reward and coupon module 116 may only reward the customer 122 for the price of the transaction in excess of any rewards or coupons used in a transaction, or the transaction handling module 114 may be configured to only receive or store the price of the transaction in excess of any rewards or coupons used in a transaction.

Once the reward and coupon module 116 determines what to reward the customer 122, the reward and coupon module 116 may be further configured to store the reward in the reward and coupon information 208 portion of the database 106. In one exemplary embodiment, the reward and coupon module 116 may be configured to reward the customer 122 with a reward or a coupon when the customer 122 first signs up for the mobile loyalty and payment system 100. In another exemplary embodiment, the reward and coupon module 116 may be further configured to reward the customer 122 with a reward or coupon on the customer's birthday. In yet another exemplary embodiment, the reward and coupon module 116 may also be configured to reward the customer 122 with a reward or coupon when the customer 122 enters a reward or coupon code into the loyalty application 120.

In step 432, the reward and coupon module 116 may be configured to send a notification or a confirmation to the customer mobile device 118. This notification may include information about the transaction such as the price of the transaction, the items purchased in the transaction, the time the transaction took place, the rewards or coupons used in the transaction, the rewards or coupons earned as a result of the transaction, or any other information that may be useful to the customer 122. In one exemplary embodiment, the customer mobile device 118 receives a notification from the loyalty server 102 through a network 130, and displays the notification to the customer 122 through the use of the loyalty application 120. It is not necessary that all information sent to the customer mobile device 118 is displayed to the customer 122. A skilled artisan will appreciate that there are other methods for sending or displaying the notification or confirmation to the customer 122.

Figure 5:
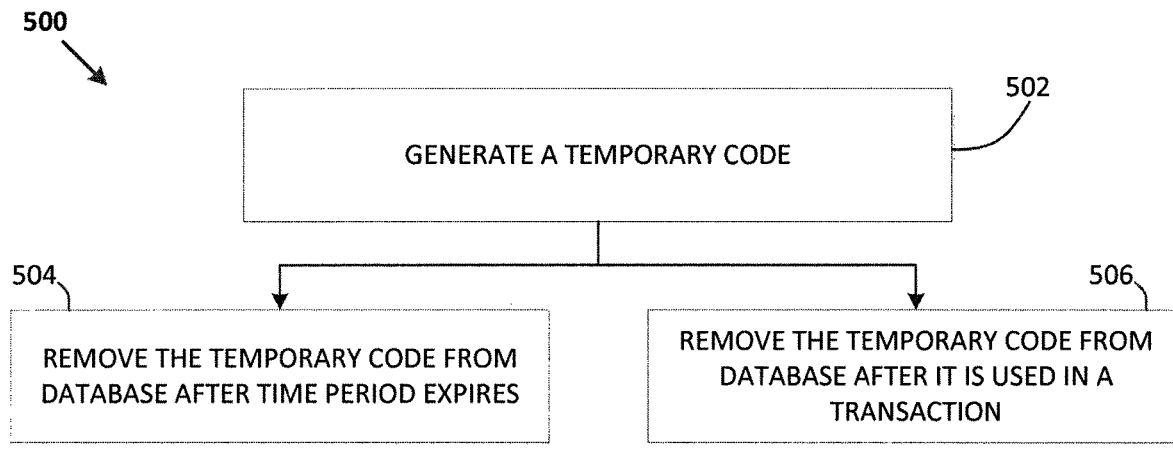
FIG. 5 is a flowchart illustrating a process for generating and removing a temporary code.

FIG. 5 is a flowchart illustrating a process for generating and removing a temporary code. Process 500 may include a step 502 to generate a temporary code and store it in database 106, a step 504 to remove the temporary code from database 106 a time period expires, and a step 506 to remove the temporary code from database 106 after it is used in a transaction. In step 502, the code generation module 110 may be configured to generate a temporary code as discussed above with respect to step 416 in FIG. 4. Once this code is generated, the loyalty server 102 may store the temporary code in the code information 204 portion of the database 106 until a certain amount of time passes or until the temporary code is used in a transaction. In one exemplary embodiment, step 504 may utilize the processor 104 to keep track of time, and may remove the temporary code from the code information 204 after fifteen minutes has passed from the time the temporary code was created. This may free up the code for another customer 122 later. Alternatively, step 506 may involve removing the temporary code as discussed above with respect to steps 426 and 428 in FIG. 4. A skilled artisan will appreciated that there are other methods of generating and removing temporary codes.

Figure 6:
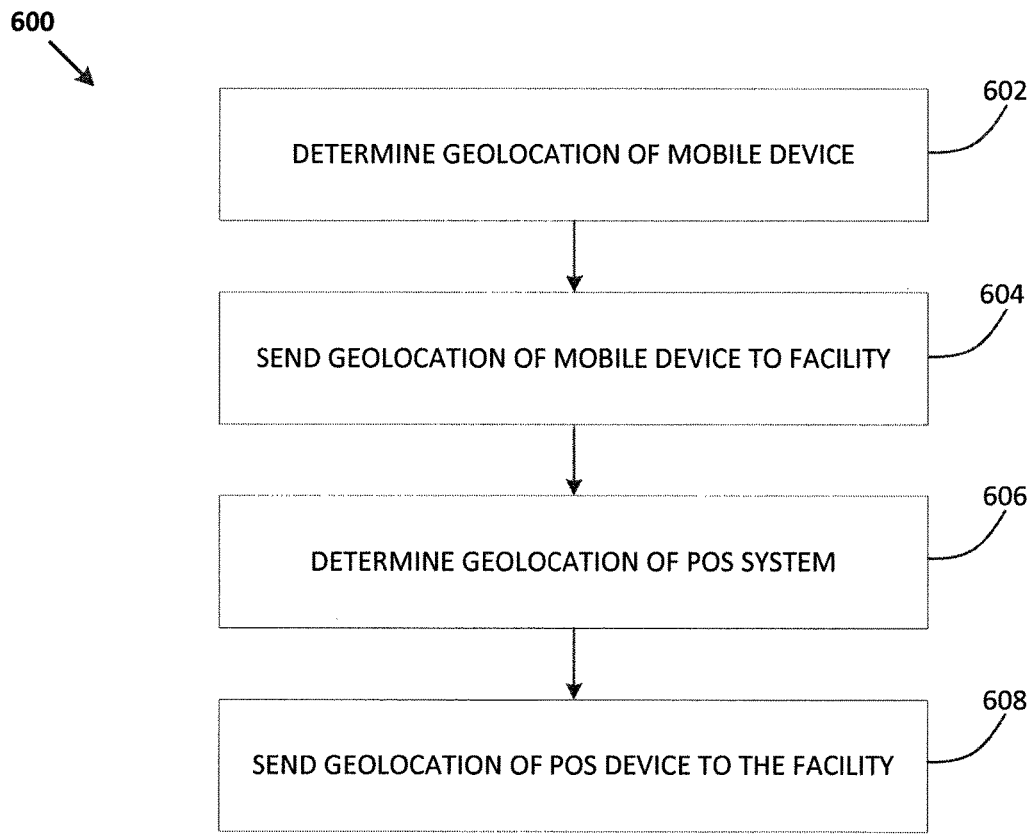
FIG. 6 is a flowchart illustrating a process for obtaining and sending geolocation information to an apparatus used in managing a mobile loyalty and payment system.

FIG. 6 is a flowchart illustrating a process for obtaining and sending geolocation information to a facility used in managing a mobile loyalty and payment system. Process 600 may contain a step 602 to determine geolocation of mobile device, a step 604 to send geolocation of mobile device to the facility, a step 606 to determine geolocation of POS system, and a step 608 to send geolocation of POS device to the facility. Various methods exist for determining the geolocation of a mobile device or some other device connected through a network. In one exemplary embodiment, step 602 or step 606 may determine the geolocation of a mobile device or a POS system through the use of interne protocol (IP) addresses, global positioning system (GPS) coordinates, radio frequency (RF) locations methods, radiolocation methods, MAC addresses, hardware or software embedded information, or some other method for determining the geolocation of an object.

Since a merchant may have multiple store locations, and since each store may desire to treat rewards and coupons differently, the mobile loyalty and payment system 100 may be configured to handle this. If the mobile loyalty and payment system 100 utilizes geolocation information, the loyalty application 120 running on the customer mobile device 118 may be configured to display different information to the customer 122 based on the geolocation information obtained. In one embodiment, the loyalty application 120 may be configured to display which rewards or coupons are eligible or not eligible on the customer mobile device 118 based on the geolocation information obtained. The loyalty application 120 may also be configured to display which items the rewards or coupons are eligible for.

Since some methods of determining the geolocation of an object have limitations on their own or depending on the object in question, step 602 and step 606 may use different methods for determining the geolocation of the mobile device and the POS system respectively. In step 604 and step 608 the determined geolocation of the mobile device and the POS system respectively may be sent to an apparatus corresponding to the facility. This apparatus may be configured to store the geolocation information, or may be configured to modify the geolocation information received into another format before storing the geolocation information. Therefore, all of the geolocation information may not be used by the apparatus or otherwise sent to the apparatus. In one exemplary embodiment the apparatus is the loyalty server 102 of FIG. 1. In another exemplary embodiment the geolocation information sent to the loyalty server 102 is used to create temporary codes for use in the mobile loyalty and payment system 100.

Figure 7:
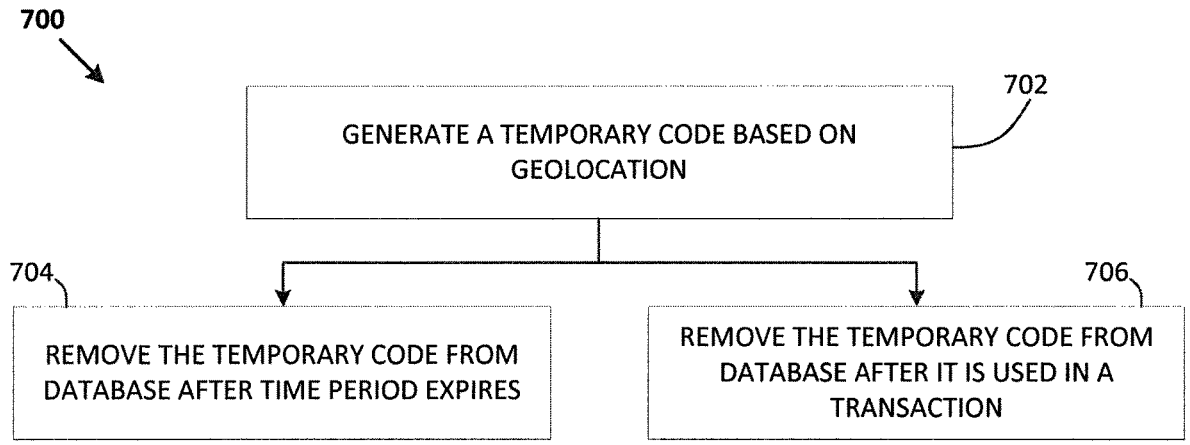
FIG. 7 is a flowchart illustrating a process for generating and removing a temporary code, wherein the code is based on some of the geolocation information in FIG. 6.

FIG. 7 is a flowchart illustrating a process for generating and removing a temporary code, wherein the temporary code is based on some of the geolocation information in FIG. 6. Process 700 may contain a step 702 to generate a temporary code based on geolocation and store the code in database 106, a step 704 to remove the temporary code from database 106 after a time period expires, and a step 706 to remove the temporary code from database 106 after it is used in a transaction. Part of step 702 may be implemented in a similar manner to the method of creating a temporary code described above with respect to step 416 of FIG. 4 using the code generation module 110. In one exemplary embodiment, the code generation module 110 may be configured to allocate short codes based on the geolocation information. For example, the encoding of short codes can incorporate the geolocation information. As another example, short codes can be distributed in a way such that there is no duplication of short codes for adjacent geographic areas. In another exemplary embodiment, the code generation module 110 may be configured to create a four digit-short code as a first portion of the temporary code. The code generation module 110 may be further configured to create a second portion of the temporary code using the geolocation information determined in process 600. In yet another embodiment, the first portion of the temporary code may be the only portion of the code displayed on the customer mobile device 118, and therefore may be the only portion of the code entered into the POS system 124. This method could increase the available number of unique codes in the mobile loyalty and payment system 100 while keeping the customer's job of only remembering, reading, or entering a few digits very simple.

Since the method of determining the geolocation of the customer mobile device 118 in step 602 may be a different method than the method of determining the geolocation of the POS system 124 in step 606, this may create geolocation values that cannot be compared. The code generation module 110 may therefore be configured to create a reference value based on the geolocation information received. In one exemplary embodiment, the code generation module 110 can be configured to store the geolocation information it receives from the customer mobile device 118 as the second portion of the temporary code in the code information 204 portion of the database 106. In another exemplary embodiment, the code generation module 110 can be configured to modify the geolocation information it receives from the customer mobile device 118 to create a reference value and store reference value as the second portion of the temporary code in the code information 204.

The customer matching module 112 can be further configured in accordance with various embodiments of process 700. In one exemplary embodiment, the customer matching module 112 may receive geolocation information from the POS system 124 and a four-digit short code as part of a code query. In another exemplary embodiment, the customer matching module 112 or some other apparatus may convert the geolocation information received into a reference value. In yet another embodiment, the customer matching module 112 may then search the code information 204 portion of the database 106 for a temporary code stored there that contains a matching four-digit short code and matching geolocation information or a matching reference value. Each temporary code stored in the code information 204 may relate to a customer 122 stored in the customer information 204. Upon finding a match, the customer matching module 112 may send to the POS system 124 at least some portion of the customer information 202 identified through the matched temporary code.

Whatever method used in step 702, once a code is generated, the loyalty server 102 may store the temporary code in the code information 204 portion of the database 106 until a certain amount of time passes or until the temporary code is used in a transaction. In one exemplary embodiment, step 704 may utilize the processor 104 to keep track of time, and may remove the temporary code from the code information 204 after fifteen minutes has passed from the time the temporary code was created. This may free up the code for another customer 122 later. Alternatively, step 706 may involve removing the temporary code as discussed above with respect to steps 426 and 428 in FIG. 4. A skilled artisan will appreciate that there are other methods of generating and removing temporary codes.

Figure 8:
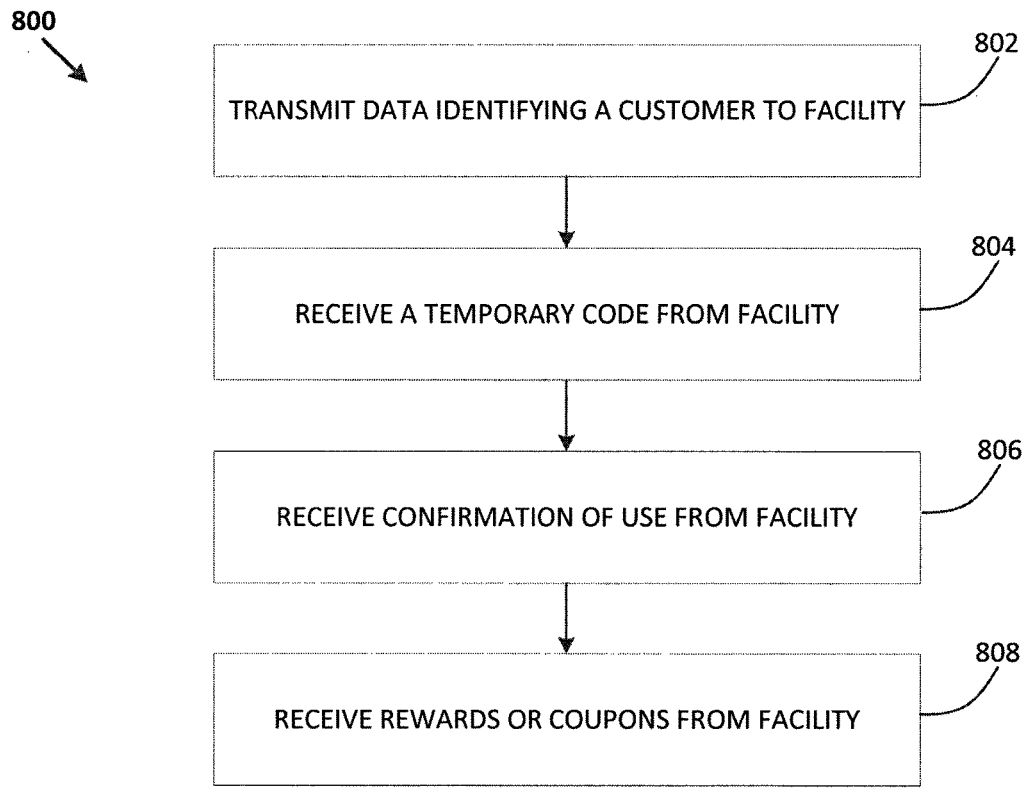
FIG. 8 is a flowchart illustrating a process by which a mobile device may utilize a mobile loyalty and payment system.

FIG. 8 is a flowchart illustrating a process by which a mobile device may utilize a mobile loyalty and payment system. Process 800 may involve a step 802 for a mobile device to transmit data identifying a customer to a facility, a step 804 to receive a temporary code from the facility, a step 806 to receive confirmation of use from the facility, and a step 808 to receive rewards or coupons from the facility. In one exemplary embodiment, the mobile device used in process 800 is the customer mobile device 118 of FIG. 1 and the facility used in process 800 is the loyalty server 102 of FIG. 1. Step 802 may involve transmitting information to the loyalty server 102 that is stored or otherwise inputted into the customer mobile device 118. This information may be information that uniquely identifies the customer 122 as discussed above with respect to the customer identification phase 402 of FIG. 4, or may be the customer's login information as discussed below.

In one exemplary embodiment, a customer 122 may first log in to the loyalty application 120 installed on the customer mobile device 118. In accordance with this embodiment, the customer mobile device 118 may transmit the customer's login information through the network 130 to the loyalty server 102, and the customer identification module 108 may be configured to log the customer 122 in. The customer identification module 108 may use the customer's login information to determine whether the customer 122 has previously registered to use the mobile loyalty and payment system 100 by looking up the customer's login information in the customer information 202 portion of the database 106. In one exemplary embodiment, the customer identification module 108 can be configured to receive a customer's email address or username, and compare it to email addresses or usernames stored in the customer information 202. In accordance with this embodiment, the customer identification module 108 may also receive a password from the customer mobile device 118, and may also compare the password received to the password related to the email address or username identified. If the customer identification module 108 is unable to identify a match, the loyalty server 102 may send an error message to the customer mobile device 118.

As a part of the customer 122 login, or as a separate step, the customer mobile device 118 may transmit data identifying the customer 122 to the loyalty server 102. As a part of this step, or as a separate step, the customer mobile device 118 may be further configured to transmit information to the loyalty server 102 about a reward or coupon the customer 122 wishes to redeem. In one exemplary embodiment, the customer 122 may press a button in the loyalty application 120 running on the customer mobile device 118 in order to earn rewards as part of the mobile loyalty and payment system 100. In another exemplary embodiment, the customer 122 may press a button in the loyalty application 120 in order to redeem a reward or coupon as a part of a transaction to be conducted in the mobile loyalty and payment system 100. In accordance with this embodiment, the customer 122 may be able to select the specific item or items they wish to receive in exchange for the reward or coupon. A customer 122 may also be able use the loyalty application 120 to select multiple rewards or coupons they wish to redeem, and may be able to redeem more than one reward or coupon through the use of a single temporary code.

In step 804, the mobile device may receive a temporary code generated by the apparatus. In one exemplary embodiment, the temporary code is generated by the code generation module 110 in accordance with process 500 of FIG. 5 or process 700 of FIG. 7 described above, or some other process of generating a temporary code. The temporary code received may be displayed on the customer mobile device 118 so that the customer 122 may later give a user of a POS system 124 the temporary code for use in a transaction in the mobile loyalty and payment system 100. Once the transaction is complete, step 806 may involve the mobile device receiving information from the apparatus regarding the use of the temporary code in the transaction. In one exemplary embodiment, the customer mobile device 118 may receive confirmation from the loyalty server 102. This confirmation may include information about the transaction discussed above with respect to step 432 of FIG. 4.

In step 808, the mobile device may also receive rewards or coupons from the apparatus. In one exemplary embodiment, the customer 122 earns rewards or coupons in accordance with step 430 of FIG. 4. In another exemplary embodiment, the customer mobile device 118 receives or displays a reward or coupon from the loyalty sever 102 in accordance with step 432 of FIG. 4. The mobile device may be further configured to access and display previously earned rewards or available rewards or coupons. In one exemplary embodiment, a customer 122 using the loyalty application 120 may retrieve and display on the customer mobile device 118 any rewards and coupons stored in the reward and coupon information 208 portion of the database 106 that relate to the customer 122. In another exemplary embodiment, the rewards and coupons stored in the reward and coupon information 208 relate to a customer 122 stored in the customer information 202.

Figure 9:
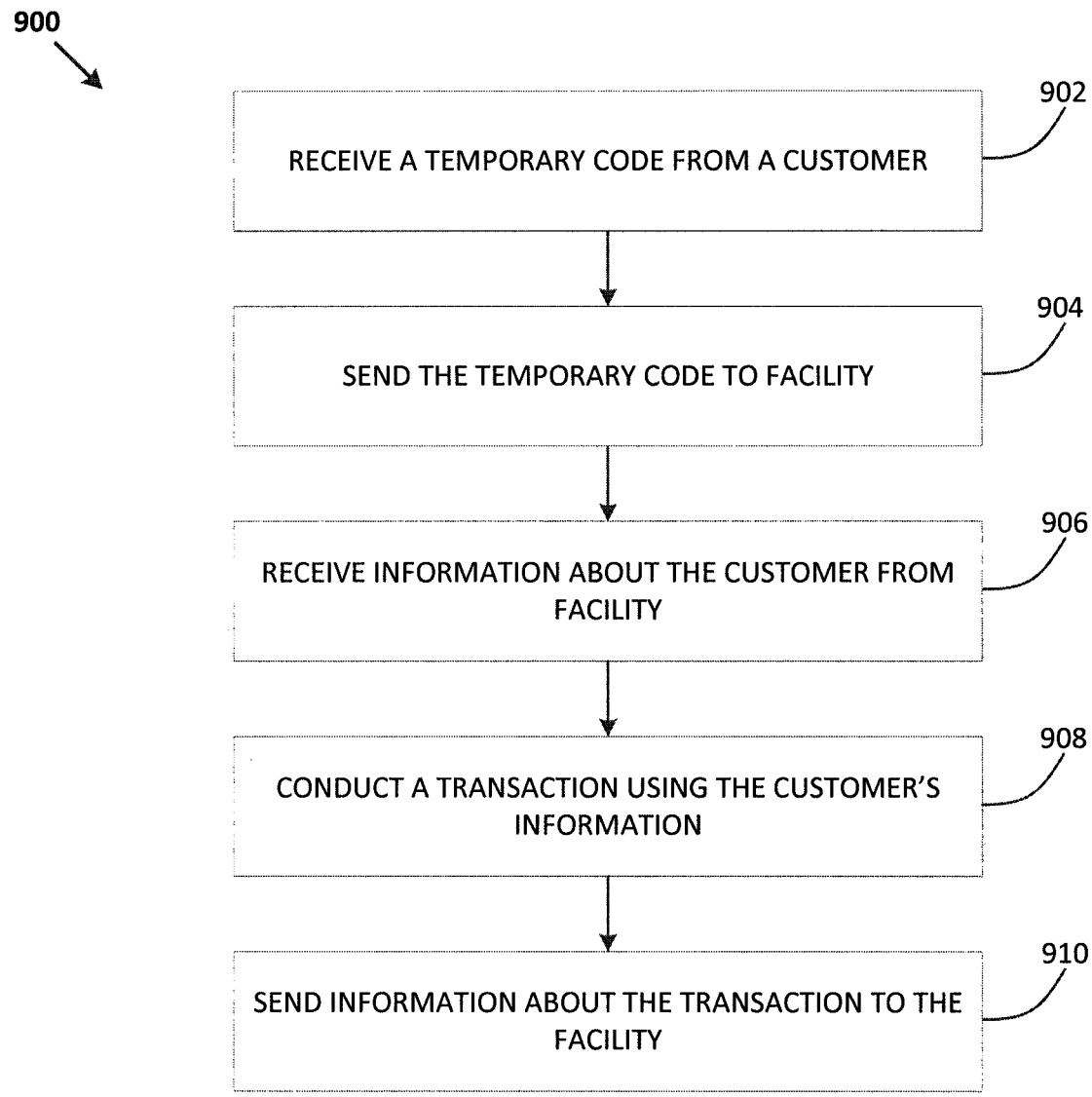
FIG. 9 is a flowchart illustrating a process by which a point of sale system may utilize a mobile loyalty and payment system.

FIG. 9 is a flowchart illustrating a process by which a point of sale system may utilize a mobile loyalty and payment system. Process 900 may include a step 902 to receive a temporary code from a customer, a step 904 to send the temporary code to a facility, a step 906 to receive information about the customer from the facility, a step 908 to conduct a transaction using the customer's information, and step 910 to send information about the transaction to the facility. In one exemplary embodiment, this point of sale system may be the POS system 124 utilizing the mobile loyalty and payment system 100 and the facility may be the loyalty server 102. In step 902, the POS system 124 can be configured to receive a temporary code from a customer 122 as described above. In one exemplary embodiment, the customer 122 may orally recite a four-digit temporary code that the customer 122 received from the loyalty server 102 to a user (not shown) operating a terminal 126 on the POS system 124. In another exemplary embodiment, the user may manually input the four digit code into the terminal 126 operating with the loyalty software 128.

In step 904, the POS system 124 may send this temporary code as a part of a code query to the loyalty server 102. If the temporary code was generated in accordance with process 500, the customer matching module 112 may be implemented as described in step 406 above. If the temporary code was generated using geolocation information in accordance with process 700, the loyalty server 102 or some other apparatus may need to handle the code query as described in the detailed description of FIG. 7 above. Once the customer matching module 112 identifies a match, the loyalty server 102 may send at least some portion of the identified customer's information to the POS system 124. In step 906, the POS system 124 may receive some of the customer's information from the loyalty server 102, and may display the information to the user of the POS terminal 126. As discussed above, this information may include the customer's name, phone number, account number, or other information related to the customer 122.

After receiving a customer's information, in step 908, the POS system 124 may be configured to conduct a transaction using the customer's information. Once the transaction is complete, in step 910 the POS system may send information about the transaction to the loyalty server 102. The information about the transaction may include the price of the transaction, the items ordered in the transaction, the name or account number of the customer 122 involved in the transaction, the temporary code used in the transaction, the location or name of the store where the transaction took place, the time the transaction took place, or other information that may be relevant to the transaction. Once the information is received by the loyalty server 102, the loyalty server 102 may process the transaction in accordance with step 426, step 428, step 430, step 432, or any combination thereof.

Figure 10:
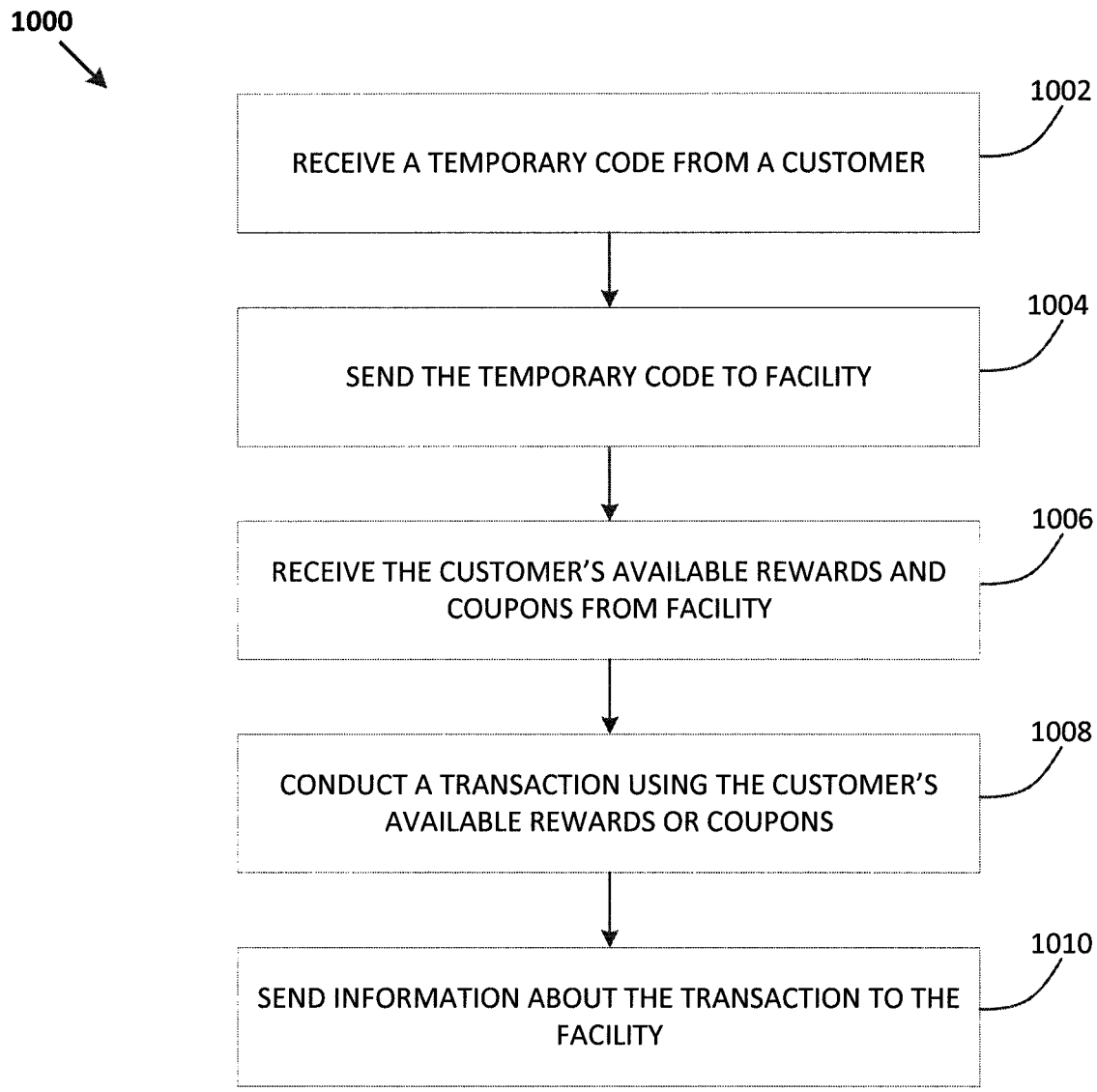
FIG. 10 is a flowchart illustrating a process by which a point of sale system may utilize a mobile loyalty and payment system, wherein a customer using the loyalty and payment system wishes to use a reward or coupon.

FIG. 10 is a flowchart illustrating a process by which a point of sale system may utilize a mobile loyalty and payment system, wherein a customer using the loyalty and payment system wishes to use a reward or coupon. Process 1000 may include a step 1002 to receive a temporary code from a customer, a step 1004 to send the temporary code to a facility, a step 1006 to receive information about the customer's available rewards and coupons from the facility, a step 1008 to conduct a transaction using the customer's available rewards or coupons, and a step 1010 to send information about the transaction to the facility. In one exemplary embodiment, this point of sale system may be the POS system 124 utilizing the mobile loyalty and payment system 100 and the facility may be the loyalty server 102. In step 1002, the POS system 124 can be configured to receive a temporary code from a customer 122 as described above. In one exemplary embodiment, the customer 122 may orally recite a four-digit temporary code that the customer 122 received from the loyalty server 102 to a user (not shown) operating a terminal 126 on the POS system 124. In another exemplary embodiment, the user may manually input the four digit code into the terminal 126 operating with the loyalty software 128.

In step 1004, the POS system 124 may send this temporary code as a part of a code query to the loyalty server 102. If the temporary code was generated in accordance with process 500, the customer matching module 112 may be implemented as described in step 406 above. If the temporary code was generated using geolocation information in accordance with process 700, the loyalty server 102 or some other apparatus may need to handle the code query as described in the detailed description of FIG. 7 above. Once the customer matching module 112 identifies a match, the loyalty server 102 may send at least some portion of the identified customer's information to the POS system 124, including the customer's available rewards and coupons. In step 1006, the POS system 124 may receive the customer's available rewards and coupons from the loyalty server 102, and may also receive some of the customer's information. The POS system 124 may also display the rewards, coupons, and other information to the user of the POS terminal 126. As discussed above, this additional information may include the customer's name, phone number, account number, or other information related to the customer 122.

After receiving a customer's available rewards and coupons, as well as other information about the customer 122, in step 1008, the POS system 124 may be configured to conduct a transaction using the customer's available rewards or coupons. In one exemplary embodiment, an available coupon may be a fifteen percent off coupon, and an available reward may be a free drink reward. In another embodiment, the available rewards may be the total number of points a customer 122 has earned in the mobile loyalty and payment system 100. Once the transaction is complete, in step 1010 the POS system 124 may send information about the transaction to the loyalty server 102. The information about the transaction may include information about any rewards or coupons use in the transaction, the price of the transaction, the items ordered in the transaction, the name or account number of the customer 122 involved in the transaction, the temporary code used in the transaction, the location or name of the store where the transaction took place, the time the transaction took place, or other information that may be relevant to the transaction. Once the information is received by the loyalty server 102, the loyalty server 102 may process the transaction in accordance with step 426, step 428, step 430, step 432, or any combination thereof.

Figure 11:
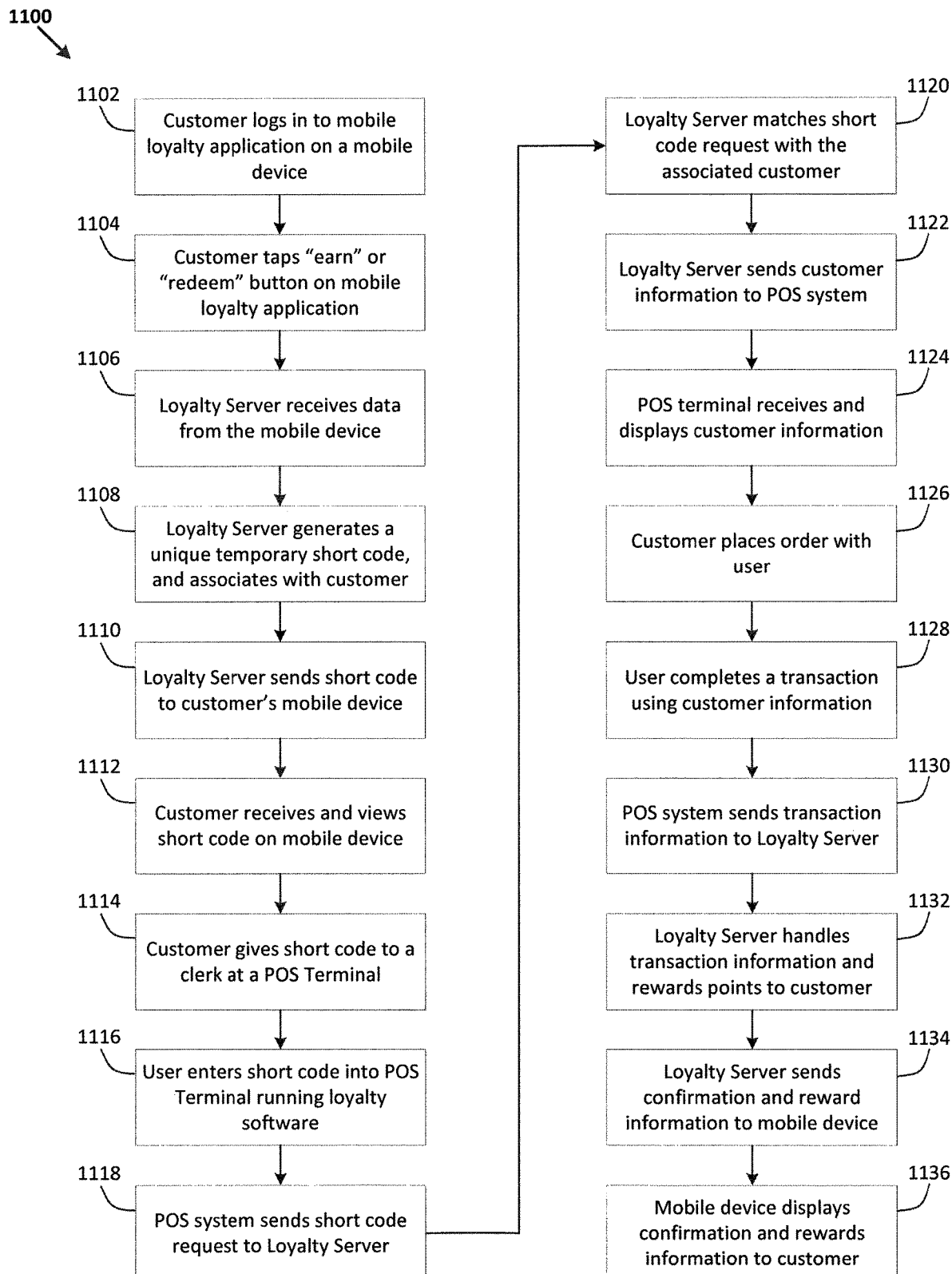
FIG. 11 is a flowchart illustrating a process by which a mobile loyalty and payment system may be implemented.

FIG. 11 is a flowchart illustrating a process by which a mobile loyalty and payment system may be implemented. Process 1100 may start a step 1102 where a customer 122 logs in to the loyalty application 120 running on a customer mobile device 118. If a customer 122 has not previously registered to use the loyalty application 120, they may be prompted to do so. When a customer 122 registers to use the loyalty application 120, they may provide personal information such as their name, address, phone number, email address, username, a picture of themselves, or some other information that may be useful in the mobile loyalty and payment system 100. In one exemplary embodiment, the customer's username may be the customer's email address or a unique username created by the customer 122. When registering to use the loyalty application 120, a customer 122 may use a code listed or embedded in a customer identification (ID) card or gift card. The ID card or gift card may contain instructions written on the card explaining how a customer 122 may sign up for the mobile loyalty and payment system 100.

In one exemplary embodiment, if a customer 122 uses an ID card or gift card to register themselves or otherwise adds an ID card or gift card later, a POS system 124 may use the information listed or embedded on the ID card or gift card to look up a customer's information instead of using a temporary code. The POS system 124 may then conduct a transaction in the mobile loyalty and payment system 100 similar to the way the POS system 124 may look up a customer's information and conduct a transaction using the temporary code described herein. In accordance with this embodiment, a user of the POS system 124 operating a POS terminal 126 may swipe the ID card or gift card, or otherwise enter a number listed on the card, and the number stored on the card, or otherwise entered, may be sent as part of a code query to the loyalty server 102. In another embodiment, the ID card or gift card may only be associated with one customer 122. In yet another embodiment, the POS system 124 may look up a customer's information and conduct a transaction in the mobile loyalty and payment system 100 using the customer's phone number in a similar manner to the method of using an ID card or gift card described above.

Once a customer 122 has registered themselves to use the loyalty application 120, the customer 122 may earn rewards or coupons which may be used in the mobile loyalty and payment system 100 in various ways. In one exemplary embodiment, the customer 122 may earn a reward for registering to use the loyalty application 120, earn a reward each year on their birthday, or earn rewards points for each purchase made using the mobile loyalty and payment system 100. In another exemplary embodiment, the customer 122 may be able to add coupons to their account by entering special promotional codes into the loyalty application 120 or the mobile loyalty and payment system 100 may otherwise add coupons to the customer's account. Additionally, the customer 122 may be able to use the loyalty application 120 to redeem rewards and coupons they have earned, to add gift cards to their account, to otherwise load money onto their account, or to pay for a transaction using some form of mobile payment.

The loyalty application 120 may include functionality that allows a customer 122 to use the customer mobile device 118 as a virtual wallet as a form of mobile payment. In one embodiment, a customer 122 may add multiple gift cards on to their account, and the loyalty application 120 may be configured to keep track of the available balances of each of the gift cards as well as the aggregate balance of all gift cards added. In accordance with this embodiment, the customer 122 may be able to use the aggregate balance as a form of mobile payment in conducting a transaction in the mobile loyalty and payment system 100, and eliminate the need to use multiple gift cards for one transaction if the total price of the transaction exceeds the balance of an individual gift card. In another embodiment, the loyalty application 120 may be configured to allow a customer 122 to load funds onto their account without the use of any gift cards. This loaded value may be aggregated with the total gift card balance, and may be used as a form of mobile payment within the mobile loyalty and payment system 100. In yet another embodiment, the customer 122 may be able to use their available rewards or coupons in conjunction with some form of mobile payment.

Once a customer 122 has logged into the loyalty application 120, process 1100 may move to step 1104 where a customer 122 may tap an "earn" button or a "redeem" button displayed within the mobile loyalty application 120. In one embodiment, the "earn" button may be used by a customer 122 who wishes to earn rewards in the mobile loyalty and payment system 100, but does not wish to use any rewards or coupons in a transaction. In accordance with this transaction, when the customer 122 taps the "earn" button, the customer mobile device 118 may send a request to the loyalty server 102 for a short code. In another exemplary embodiment, the "redeem" button may be associated with one or more of the customer's available rewards or coupons, and pressing the "redeem" but may send a request to the loyalty server 102 for a short code. In accordance with this embodiment, a customer 122 may be able to associate multiple rewards or coupons with one short code by pressing a "redeem" button associated with each reward or coupon to be redeemed before the short code is removed from the system.

Process 1100 may then move to step 1106 where the loyalty server 102 receives data from the customer mobile device 118. In one embodiment, the data received from the customer mobile device 118 may be the username and password of the customer 122, and the customer identification module 108 may be used to identify or authenticate the customer 122. In another embodiment, the data received may also contain information about a reward or coupon to be redeemed. Process 1100 may next move to step 1108 where the loyalty sever 102 may generate a unique four-digit short code and may associate the code with the customer 122. In one exemplary embodiment, the code may be generated by the code generation module 110 in accordance with process 500 or process 700. The generated temporary code may be stored in the code information 204 portion of the database 106, and may contain one or more relations to a customer 122 contained in the customer information 202 portion of the database 106. If the customer 122 wishes to use a reward or coupon in the transaction, the short code stored may contain one or more relations to rewards or coupons stored in the reward and coupon information 208 portion of the database.

Process 1100 may then move to step 1110 where the loyalty server 102 may send the generated short code to a customer mobile device 118. In one exemplary embodiment, the short code is sent over a network 130. If the short code was generated using geolocation information in accordance with process 700, the loyalty server may only send a portion of the short code to the customer mobile device 118. In one embodiment, the portion of the short code generated using geolocation information that is sent to the customer 122 may be a four-digit code.

Process 1100 may then move to 1112 where the customer 122 may receive and view the sent short code on their customer mobile device 118. In one exemplary embodiment, the short code is displayed through the loyalty application 120 running on the customer mobile device 118. Process 1100 may then move to step 1114 where the customer 122 gives the short code to a user, such as a clerk, at a POS terminal 126. In one exemplary embodiment, the short code is a four-digit short code, and the customer 122 orally recites the four-digit code, or otherwise shows the four-digit code to the user. In another exemplary embodiment, the user may be a barista working at a coffee shop, and the customer 122 may wish to order a coffee using the mobile loyalty and payment system 100. Process 1100 may then move to step 1116 where the user may enter the short code into the POS terminal 126 running the loyalty software 128. Process 1100 may then move to step 1118 where the POS system 124 may send the short code entered by the user as part of a short code request to the loyalty server 102.

Process 1100 may next move to step 1120 where the loyalty server 102 may match the short code request with the associated customer 122. In one exemplary embodiment, the customer matching module 112 may be configured to match the code information received to the code information stored in the code information 204 portion of the database 106. In accordance with this embodiment, the short code stored that matches the request may be related to a customer 122 stored in the customer information 202 portion of the database 106.

Upon identifying a match, process 1100 may move to step 1122 where the loyalty server 102 may send the identified customer's information to the POS system 124. In one exemplary embodiment, the customer's information sent to the POS system 124 may include the customer's name, the customer's telephone number, the customer's email address, the customer's available rewards, the amount of points the customer 122 has earned or otherwise has available, or the customer's available coupons. Process 1100 may then move to step 1124 where the POS terminal receives the identified customer's information and displays at least some portion of the information for the user to see. From here, process 1100 may then move to step 1126 where the customer 122 may place an order with the user. If the customer 122 wishes to redeem a reward or coupon, the loyalty software 128 may be configured to initiate a transaction within the POS system 124, and the user may be able to add additional items to the transaction. In one exemplary embodiment, the customer 122 may order a coffee from the user, who may be a barista working at a coffee shop. In another exemplary embodiment, the customer 122 may wish to redeem a buy-one-get-one-free coupon, and may have selected two eligible coffees through the loyalty application 120. In accordance with this embodiment, the POS terminal 126 may display an order to the user that currently contains the two coffees previously selected by the customer 122. The user may be able to add additional items to the order before finalizing the transaction. Process 1100 may then move to step 1128 where the user completes a transaction in the POS system 124 using the customer's information. In one exemplary embodiment, the user may complete the transaction using some form of mobile payment discussed above.

Process 1100 may then move to step 1130 where the POS system 124 may send information about the conducted transaction to the loyalty server 102. In one exemplary embodiment, the information about the transaction may include the total price of the order, information about the items ordered, or information about any rewards or coupons used. Process 1100 may then move to step 1132 where the loyalty server 102 may handle the transaction information and reward points to the customer 122. In one exemplary embodiment, the transaction handling module 114 may store at least some portion of the transaction information received in the transaction information 206 portion of the database 106. The transaction handling module 114 may also mark any rewards or coupons used in the transaction as used by modifying the reward and coupon information 208 portion of the database 106. In another exemplary embodiment, the reward and coupon module 116 is configured to reward points to the customer 122 based on the transaction information received from the POS system 124 or otherwise stored in the transaction information 206. In accordance with this embodiment, the reward and coupon module 116 may round the total price of the transaction to the nearest whole dollar, reward the customer 122 with one point per dollar, and may store this information in the reward and coupon information 208 portion of the database 106. In yet another embodiment, the reward and coupon module 116 may only reward the customer for money the customer 122 spends in excess of the coupons or rewards redeemed in a transaction.

Process 1100 may then move to step 1134 where the loyalty server 102 may send confirmation and reward information to the customer mobile device 118. In one embodiment, the reward and coupon module 116 may be configured to send a notification to the customer mobile device 118 that includes the total price of the transaction completed using the mobile loyalty and payment system 100, the rewards or coupons used, if any, and the rewards or coupons earned, if any. In accordance with this embodiment, the reward and coupon module 116 may be further configured to send a notification to the customer mobile device 118 that includes the number of points the customer 122 earned as a result of the transaction. Process 1100 may then move to step 1136 where the customer mobile device 118 may display confirmation and rewards information to the customer 122. This information may include the price of the transaction, the number of rewards points earned, if any, or information about the rewards or coupons used in the transaction, if any. In one exemplary embodiment, the customer 122 may also use the loyalty application 120 to view their available rewards and coupons or to view a listing of their recently conducted transactions. In accordance with this embodiment, the recent history may contain a listing of all transactions conducted in the mobile loyalty and payment system 100, whether the means of pairing used was through a temporary code, an ID cards or gift cards, or a customer's telephone number.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for managing temporary codes, comprising:
a database; and
a first processor configured to:
receive, via a packet switched network, data from a wireless mobile electronic device, the data identifying a user of the mobile device, the mobile device comprising:
a memory storing a mobile application,
a second processor operatively connected and in data communication with the memory, the second processor configured to run the mobile application,
a wireless communications capability that is also operatively connected and in data communication with the second processor and the memory, and
a display configured to provide images;
generate a first temporary code, the first temporary code including a first portion including numbers and/or letters and a second portion including unique information, wherein the first portion of the temporary code has a length that enables a predetermined number of unique first portions, and wherein the second portion of the first temporary code is configured to ensure that the first temporary code is unique within a group of temporary codes for a number of users that is greater than the predetermined number of unique first portions, the unique information being generated based on at least one of the following:
first unique information associated with the mobile device,
geolocation information associated with the mobile device,
second unique information associated with a point of sale system, and
geolocation information associated with the point of sale system;
transmit, via the packet switched network, the first temporary code to the mobile device;
store the first temporary code in the database comprising a plurality of temporary codes, the database further storing information about the identified user associated with the first temporary code, the database being remote from both the mobile device and the point of sale system;
receive, via the packet switched network, a second temporary code from the point of sale system, the point of sale system comprising at least one point of sale terminal configured to: execute application software and receive the second temporary code from the user of the mobile device;
compare the second temporary code with the plurality of temporary codes stored in the database;
upon identifying a match of the second temporary code and the first temporary code stored in the database, transmit, via the packet switched network, the information about the identified user to the application software in the point of sale system; and
upon failing to identify a match between the second temporary code and one of the plurality of temporary codes stored in the database, transmit, via the packet switched network, an error message to the point of sale system.

2. The system of claim 1, wherein the first processor is further configured to:
maintain the database comprising:
the information about the identified user, including data identifying the user within a mobile loyalty and payment system,
any temporary code associated with the user,
the user's historic transaction information, and
the user's rewards or coupons information;

receive, via the packet switched network, transaction information from the point of sale system for transactions conducted using the information about the identified user;

reward the user with rewards or coupons based on the transaction information; and transmit, via the packet switched network, the identified user's available rewards or coupons to the mobile device.

3. The system of claim 2, wherein the first processor is further configured to transmit, via the packet switched network, a confirmation to the mobile device based in part on the transaction information, the confirmation comprising information about the rewards or coupons the user earned based on the transaction information.

4. The system of claim 1, wherein the first temporary code is no longer useable after a period of time.

5. The system of claim 1, wherein the first temporary code is no longer useable after the user completes a transaction using the first temporary code.

6. The system of claim 1, wherein the first temporary code is shorter in length than the length of the user's telephone number.

7. The system of claim 1, wherein the first processor is further configured to:
receive, via the packet switched network, data from the mobile device relating to the mobile device's geographic location;
receive, via the packet switched network, data from the point of sale system relating to the point of sale system's geographic location,
wherein the first temporary code comprises a first code portion which is a code shorter in length than the length of the user's telephone number and a second code portion that is based on at least one or both of the data relating to the mobile device's geographic location and the data relating to the point of sale system's geographic location.

8. The system of claim 7, wherein the first processor is further configured to:
generate the second code portion of the first temporary code based on the mobile device's geographic location,
wherein a second code portion of the second temporary code received from the point of sale system is generated by the point of sale system.

9. The system of claim 1, wherein the first processor is further configured to:
maintain the database comprising the identified customer's historic transaction information; and
upon identifying a match of the first and second temporary codes, transmit, via the packet switched network instructions to adjust a current transaction between the identified customer and the point of sale system based on the historic transaction information.

10. The system of claim 1, wherein the information about the identified user comprises information corresponding to the identified user's interactions with or modifications to an account associated with the identified user.

11. A method of managing temporary codes, comprising:
receiving, via a packet switched network, data from a wireless mobile electronic device, the mobile device comprising:
a memory storing a mobile application,
a processor operatively connected and in data communication with the memory, the processor configured to run the mobile application,
a wireless communications capability that is also operatively connected and in data communication with the processor and the memory, and
a display configured to provide images, the data identifying a user of the mobile device;
generating a first temporary code, the first temporary code including a first portion including numbers and/or letters and a second portion including unique information, wherein the first portion of the temporary code has a length that enables a predetermined number of unique first portions, and wherein the second portion of the first temporary code is configured to ensure that the first temporary code is unique within a group of temporary codes for a number of users that is greater than the predetermined number of unique first portions, the unique information being generated based on at least one of the following:
first unique information associated with the mobile device,
geolocation information associated with the mobile device,
second unique information associated with a point of sale system, and
geolocation information associated with the point of sale system;
transmitting, via the packet switched network, the first temporary code to the mobile device;
storing the first temporary code in a database comprising a plurality of temporary codes, the database further storing information about the identified user associated with the first temporary code, the database being remote from both the mobile device and the point of sale system;
receiving, via the packet switched network, a second temporary code from the point of sale system, the point of sale system comprising at least one point of sale terminal configured to: execute application software and receive the second temporary code from the user of the mobile device;
comparing the second temporary code with the plurality of temporary codes stored in the database;
upon identifying a match of the second temporary code and the first temporary code stored in the database, transmitting, via the packet switched network, the information about the identified user to the application software in the point of sale system; and
upon failing to identify a match between the second temporary code and one of the plurality of temporary codes stored in the database, transmitting, via the packet switched network, an error message to the point of sale system.

12. The method of claim 11, further comprising:
maintaining the database comprising:
the information about the identified user, including data identifying the user within a mobile loyalty and payment system,
any temporary code associated with the user,
the user's historic transaction information, and
the user's rewards or coupons information;
receiving, via the packet switched network, transaction information from the point of sale system for transactions conducted using the information about the identified user;
rewarding the user with rewards or coupons based on the transaction information; and transmitting, via the packet switched network, the identified user's available rewards or coupons to the mobile device.

13. The method of claim 12, further comprising transmitting, via the packet switched network, a confirmation to the mobile device based in part on the transaction information, the confirmation comprising information about the rewards or coupons the user earned based on the transaction information.

14. The method of claim 11, wherein the first temporary code is no longer useable after a period of time.

15. The method of claim 11, wherein the first temporary code is no longer useable after the user completes a transaction using the first temporary code.

16. The method of claim 11, wherein the first temporary code is shorter in length than the length of the user's telephone number.

17. The method of claim 11, further comprising:
receiving, via the packet switched network, data from the mobile device relating to the mobile device's geographic location; and
receiving, via the packet switched network, data from the point of sale system relating to the point of sale system's geographic location, wherein the first temporary code comprises a first code portion which is a code shorter in length than the length of the user's telephone number and a second code portion that is based on at least one or both of the data relating to the mobile device's geographic location and the data relating to the point of sale system's geographic location.

18. A point of sale system, comprising:
at least one point of sale terminal including a processor configured to execute application software which, when executed, causes the processor to:
receive, via a packet switched network, a first temporary code of a user of a mobile device;
transmit, via the packet switched network, the first temporary code to an apparatus for managing temporary codes, the apparatus for managing temporary codes configured to:
generate a second temporary code, the second temporary code being generated including a first portion including numbers and/or letters and a second portion including unique information, wherein the first portion of the temporary code has a length that enables a predetermined number of unique first portions, and wherein the second portion of the first temporary code is configured to ensure that the first temporary code is unique within a group of temporary codes for a number of users that is greater than the predetermined number of unique first portions, the unique information being on at least one of the following:
first unique information associated with the mobile device,
geolocation information associated with the mobile device,
second unique information associated with the point of sale system, and
geolocation information associated with the point of sale system,
transmit, via the packet switched network, the second temporary code to the mobile device,
store the second temporary code in a database comprising a plurality of temporary codes, the database further storing information about the identified user associated with the first temporary code, the database being remote from both the mobile device and the point of sale system,
receive, via the packet switched network, the first temporary code from the point of sale system, and compare the first temporary code with the plurality of temporary codes stored in the database;
receive, via the packet switched network, the information about the user identified by the first temporary code from the apparatus upon the system identifying a match of the first temporary code received from the point of sale terminal with the second temporary code stored in the database; and
receive, via the packet switched network, an error message upon the system failing to identify a match of the first temporary code to one of the plurality of temporary codes stored in the database.

19. The point of sale system of claim 18, wherein the application software, when executed, further causes the processor to:
conduct a transaction using the identified user's information; and
transmit information about the transaction to the apparatus for managing temporary codes.

20. The point of sale system of claim 19, wherein:
the received information about the identified user includes the identified user's available rewards or coupons for use in the transaction;
the application software, when executed, further causes the processor to:
conduct the transaction using one or more of the identified user's available rewards or coupons; and
transmit, via the packet switched network, information about the user's rewards or coupons used in the transaction.

21. A method of selling goods or services, comprising:
receiving, via a packet switched network, a first temporary code from a user of a mobile device, the first temporary code being received at a point of sale system including a processor configured to execute application software;
transmitting, via the packet switched network, the first temporary code to an apparatus for managing temporary codes, the apparatus for managing temporary codes configured to:
generate a second temporary code, the second temporary code being generated including a first portion including numbers and/or letters and a second portion including unique information, wherein the first portion of the temporary code has a length that enables a predetermined number of unique first portions, and wherein the second portion of the first temporary code is configured to ensure that the first temporary code is unique within a group of temporary codes for a number of users that is greater than the predetermined number of unique first portions, the unique information being on at least one of the following:
first unique information associated with the mobile device,
geolocation information associated with the mobile device,
second unique information associated with the point of sale system, and
geolocation information associated with the point of sale system,
transmit, via the packet switched network, the second temporary code to the mobile device, store the second temporary code in a database comprising a plurality of temporary codes, the database further storing information about the user associated with the first temporary code, the database being remote from both the mobile device and the point of sale system, receive, via the packet switched network, the first temporary code from the point of sale system, and compare the first temporary code with the plurality of temporary codes stored in the database; and receiving, by the application software via the packet switched network, information about the user associated with the first temporary code from the apparatus upon the apparatus identifying a match of the first temporary code with the second temporary code stored in the database; and receiving, via the packet switched network, an error message upon the system failing to identify a match of the first temporary code to one of the plurality of temporary codes stored in the database.

22. The method of claim 21, further comprising conducting a transaction using the identified user's information, and transmitting information about the transaction to the apparatus for managing temporary codes.

23. The method of claim 22, wherein:

receiving information about the identified user further includes receiving information about the identified user's available rewards or coupons for use in the transaction;

conducting the transaction further comprises using one or more of the identified user's available rewards or coupons; and transmitting information about the transaction further includes transmitting information about the user's rewards or coupons used in the transaction.

24. A non-transitory computer-readable medium including instructions executable by a first processor of an apparatus for managing temporary codes, the instructions causing the apparatus to:

receive, via a packet switched network, data from a wireless mobile electronic device identifying a user of the mobile device, the mobile device comprising:

a memory storing a mobile application, a second processor operatively connected and in data communication with the memory, the second processor configured to run the mobile application, a wireless communications capability that is also operatively connected and in data communication with the second processor and the memory, and a display configured to provide images, the data identifying a user of the mobile device;

generate a first temporary code, the first temporary code including a first portion including numbers and/or letters and a second portion including unique information, wherein the first portion of the temporary code has a length that enables a predetermined number of unique first portions, and wherein the second portion of the first temporary code is configured to ensure that the first temporary code is unique within a group of temporary codes for a number of users that is greater than the predetermined number of unique first portions, the unique information being generated based on at least one of the following:

first unique information associated with the mobile device, geolocation information associated with the mobile device, second unique information associated with a point of sale system, and geolocation information associated with the point of sale system;

transmit, via the packet switched network, the first temporary code to the mobile device;

store the first temporary code in a database comprising a plurality of temporary codes, the database further storing information about the identified user associated with the first temporary code, the database being remote from both the mobile device and the point of sale system;

receive, via the packet switched network, a second temporary code from the point of sale system, the point of sale system comprising at least one point of sale terminal configured to: execute application software and receive the second temporary code from the user of the mobile device;

compare the second temporary code with the plurality of temporary codes stored in the database;

upon identifying a match of second temporary code and the first temporary code stored in the database, transmit, via the packet switched network, the information about the identified user to the application software in the point of sale system; and upon failing to identify a match between the second temporary code and one of the plurality of temporary codes stored in the database, transmit, via the packet switched network, an error message to the point of sale system.

25. The non-transitory computer-readable medium of claim 24, the instructions further causing the apparatus to:

maintain the database comprising:

the information about the identified user, including data identifying the user within a mobile loyalty and payment system, any temporary code associated with the user, the user's historic transaction information, and the user's rewards or coupons information;

receive, via the packet switched network, transaction information from the point of sale system for transactions conducted using the information about the identified user;

reward the user with rewards or coupons based on the transaction information; and transmit, via the packet switched network, the identified user's available rewards or coupons to the mobile device.

26. The non-transitory computer-readable medium of claim 25, the instructions further causing the apparatus to transmit, via the packet switched network, a confirmation to the mobile device based in part on the transaction information, the confirmation comprising information about the rewards or coupons the user earned based on the transaction information.

27. The non-transitory computer-readable medium of claim 24, wherein the first temporary code is no longer useable after a period of time.

28. The non-transitory computer-readable medium of claim 24, wherein the first temporary code is no longer useable after the user completes a transaction using the first temporary code.

29. The non-transitory computer-readable medium of claim 24, wherein the first temporary code is shorter in length than the length of the user's telephone number.

30. The non-transitory computer-readable medium of claim 24, the instructions further causing the apparatus to:

receive, via the packet switched network, data from the mobile device relating to the mobile device's geographic location; and receive, via the packet switched network, data from the point of sale system relating to the point of sale system's geographic location, wherein the first temporary code comprises a first code portion which is a code shorter in length than the length of the user's telephone number and a second code portion that is based on at least one or both of the data relating to the mobile device's geographic location and the data relating to the point of sale system's geographic location.

* * * * *